United States Patent Office 2,965,584
Patented Dec. 20, 1960

2,965,584
PREPARATION OF FOAMED HYDROPHILIC POLY-URETHANES USING PYRROLIDONE CATALYSTS

Harold L. Elkin, Trenton, N.J., assignor to Thiokol Chemical Corporation, Trenton, N.J., a corporation of Delaware No Drawing. Filed Mar. 27, 1957, Ser. No. 648,777

5 Claims. (Cl. 260—2.5)

This invention relates to synthetic sponges and more particularly to foamed synthetic plastic products that are sponge-like and hydrophilic.

In recent years, synthetic sponges have to a considerable extent replaced natural sponges because the synthetic products have a number of important advantages over natural sponges. Thus synthetic plastic sponges, e.g. rubber sponges, are relatively free from bacterial activity and decay commonly met with in natural sponges and are resistant to weak alkalis and acids. Also they release dirt more easily than natural sponges and can be more readily shaped to a desired configuration.

On the other hand, the synthetic sponges heretofore available have been subject to certain disadvantages. Thus rubber sponges although they release dirt relatively easily are non-hydrophilic and hence do not absorb water readily. Cellulose sponges, although they absorb water better than rubber sponges, do not release dirt as easily as the rubber sponges. Both rubber and cellulose sponges have relatively poor physical strength.

Sponge-like cellular plastics have also been made previously from a number of plastics polymeric materials. For example, such products have been made by reacting alkyd resins and polyisocyanates to form polyurethanes under such conditions as to achieve a relatively fine-celled structure with improved physical strength. Compositions of this type are disclosed, for example, in Simon et al. Patent 2,698,838. However, sponges made in this way, like the rubber sponges referred to above, lack the desired hydrophilic properties.

It is accordingly an object of the present invention to provide a synthetic plastic sponge material having hydrophilic properties. It is another object of the invention to provide a synthetic hydrophilic sponge material with improved physical strength. It is still another object of the invention to provide an improved pre-polymer, i.e. a partially reacted liquid composition that can be readily converted to a sponge material of the type indicated above. Other objects of the invention will be in part obvious and in part pointed out hereafter.

The hydrophilic sponge materials of the present invention are of the polyurethane type and are made in a manner generally similar to that of the polyurethane foamed plastics referred to above. However, it has been found that if the alkyd or other polyester component of the reaction mixture is blended with the proper proportion and type of polyalkylene glycol under the proper conditions as described below to produce a polyurethane foam, the desirable properties of the previous polyurethane foams are largely retained and in addition the foam material is definitely hydrophilic.

The hydrophilic properties of the present foams significantly enhance their utility for a wide variety of purposes for which sponges are used. Thus they may be used for washcloths, mops, coasters under drinking glasses to absorb condensed atmospheric moisture, sweatbands for hats, flower pot pads and for miscellaneous washing purposes. Also they may be used as matrices for growing various plants from seeds foamed in place within the plastic mass.

While the present products are particularly outstanding in their hydrophilic properties, they also have a soft texture which makes them useful in other applications wherein the ability to absorb water or other liquids may not be essential. For example, they may be advantageously used in packing delicate instruments or other delicate objects in a rigid container in such manner as to protect the instruments or articles against shock, as well as in other applications wherein the combination of soft texture and resiliency are important.

As indicated above, the principal reactants used in preparing the present products are a polyester resin of the type made by condensation of polyhydric alcohols and polybasic acids, a polyalkylene glycol and an organic diisocyanate. Foaming of the reaction mixture is produced by adding a small quantity of water thereto in the usual manner, and in order to achieve the desired foaming characteristics and resulting cell structure, minor proportions of a catalyst and one or more wetting agents are also incorporated in the mixture.

In many of their applications the present foams are desirably formed in situ in a particular environment and hence from a commercial standpoint it is desirable to have a composition that can be sold in fluid form and can be readily converted at a remote point into the solid cellular material. This requirement can be fulfilled in accordance with the present invention by reacting in suitable proportions the polyester, polyglycol and diisocyanate to form a liquid pre-polymer which can be sold as such along with a second composition comprising an aqueous mixture of catalysts and wetting agents. The pre-polymer and catalyst compositions can then be mixed at a remote point of use to form the foamed plastic in situ in a particular desired environment.

Any of the linear polyesters that have been previously proposed for use in making polyurethane resins can be used in preparing the present product. In general the more useful polyesters are those prepared by condensation of polyhydric alcohols or amino alcohols and polybasic acids containing at least 5 carbon atoms. Suitable polyhydric alcohols and amino alcohols for this purpose include ethylene glycol, diethylene glycol, glycerol, sorbitol, pentaerythritol, trimethylol propane and tri-methylol ethane, as well as amino alcohols such as the ethanolamines, aminopropanols and other lower amino-alkanols. Suitable polybasic acids for reacting with the foregoing alcohols to form linear polyesters include oxalic, adipic, sebacic, 6-amino-caproic, phthalic, iso-phthalic, terephthalic, malonic, succinic, maleic, fumaric, dimer and itaconic acids. Polyesters prepared by reaction of adipic acid with ethylene glycol and lower polyethylene glycols have been found especially satisfactory. The carboxyl content of the polyester is desirably kept below about 2% and the molecular weight of the polyester is preferably of the order of 2000 to 3000. Since a large number of polyesters have been previously proposed for reaction with polyisocyanates to form polyurethanes, it is deemed unnecessary to include a more extensive list of such polyesters in the present specification.

Similarly any of the organic polyisocyanates that have been previously proposed for the preparation of polyurethane resins may be employed in preparing the present product. Suitable polyisocyanates for use in the present process include arylene polyisocyanates such as the tolylene diisocyanates; meta-phenylene diisocyanate; 4-chloro-1, 3 phenylene diisocyanate; methylene-bis-(4-phenyl isocyanate); 1,5 naphthalene diisocyanate; 3,3'-dimethoxy-4,4'-biphenylene diisocyanate; 3,3'-diphenyl- 4,4'-biphenylene diisocyanate; triphenyl-methane triisocyanate; and alkylene polyisocyanates such as ethylene, ethylidene, propylene-1,2-butylene 1,3; hexylene 1,6; and cyclohexylene 1,2-diisocyanates. Meta-toluene diisocyanates, which are presently the diisocyanates most widely used commercially for this purpose, are entirely satisfactory for preparing the present product. A commercial mixture consisting of about 80% of the 2,4 isomer and 20% of the 2,6 isomer sold under the trade name Hylene TM may be advantageously used.

As indicated above, it has been found that foamed polyurethane plastics having marked hydrophilic properties can be obtained by mixing with the polyester the proper quantity and type of a polyethylene glycol. The polyethylene glycols used should have a molecular weight between about 600 and 6000, preferably between 1000 and 6000, and should be used in the proportions of 0.6 to 1.5 parts by weight of polyglycol per part of polyester. Polyglycols within this molecular weight range are commercially available and are sold under the trade name Carbowax.

In addition to the principal ingredients of the reaction mixture described above, minor amounts of wetting agents, catalysts and water are used to achieve the desired foaming properties. Among the wetting agents that have been found useful are liquid, non-ionic emulsifiers which are mixtures of polyalcohol carboxylic acid esters and sodium salts of organic sulfonates sold under the trade names Witco 77–86 and Emcol–H–77. Liquid anionic emulsifiers such as mixtures of alkylaryl polyether alcohols and organic sulfonates sold under the trade names Triton X–151 and Triton X–171, may also be used. In some cases combinations of non-ionic and anionic emulsifiers may be employed.

Catalysts useful in preparing the present products include 2-pyrrolidone, N-methylpyrrolidone, vinylpyrrolidone, and a number of the lactams. In achieving the hydrophilic properties characteristic of the present products, the pyrrolidones, particularly 2-pyrrolidone, have been found better than catalysts previously proposed for making polyurethane foams. The pyrrolidone catalysts give a slower and more nearly uniform foaming action and produce an open-celled structure. Also particular desired properties can be reproduced in successive batches more reliably when a pyrrolidone catalyst is used.

An illustrative general procedure for preparing the products of the present invention is as follows: The polyester, which is normally a liquid, is charged into a reaction vessel with the polyethylene glycol, which is normally a solid, the relative proportions of the two ingredients being within the range given above. The mixture is heated to a temperature sufficient to melt the polyglycol and the ingredients are mixed to blend them thoroughly. Thereafter a quantity of diisocyanate somewhat in excess of that required for reaction with the mixture of polyester and polyglycol is added and thoroughly mixed in.

The reaction mixture is heated to 100°–110° C. and held at that temperature for about one hour after which it is cooled to room temperature. The cooled reaction mixture is analyzed for excess isocyanate and the free isocyanate content thereof is adjusted to a predetermined value, e.g. 5% to 20% by weight of the mixture as unreacted NCO, depending upon the density and other properties desired in the foamed product. For example, if a cellular product having a density of 4 to 4.5 pounds per cubic foot is desired the free NCO is adjusted to 10.5%; whereas if a density of only 2 to 2.5 pounds per cubic foot is desired, the free NCO is adjusted to 12.5%. This adjustment is made by adding the necessary quantity of diisocyanate to the mixture. This mixture as thus prepared is stable and can be sold as such as a prepolymer to be mixed with wetting agents, catalysts and water at a remote point for production of the foamed plastic.

In converting the pre-polymer to a foamed plastic, the wetting agent or agents are preferably added first and stirred thoroughly into the mixture. Thereafter the catalyst and water are added with vigorous stirring for 5 to 10 seconds until the mixture is uniform and has a milky appearance. This mixture is poured into a suitable mold which has been previously treated with a release agent, and allowed to rise for 30 minutes. After a 30 minute rise, the spongy product within the mold is cured, for example, by heating in an oven for 30 minutes at 70° C. or alternatively by allowing the foam to stand 18–24 hours at room temperature. The foaming reaction can be carried out at a temperature of 20°–80° C. with a temperature of the order of 30° C. being preferred.

The quantity of wetting agent used is ordinarily between 1 and 10% of the weight of pre-polymer, and the catalyst quantity is usually within the same range. As indicated by the specific examples given below preferred results are obtained when using about 4% wetting agent and 4% catalyst in conjunction with 2% to 5% water. The foaming properties and the density of the foamed product vary with the quantity of wetting agent and catalyst used, as well as with the amount of water present. In general increases in the quantity of wetting agent and catalyst tend to produce faster foaming and a slightly lower density in the finished product.

In general the physical properties of the present products resemble those of the polyurethane foams previously made and these properties may be varied by varying the proportions of certain of the ingredients in known manner. Thus by varying the ratio of free NCO to water, the density of the foam may be varied over a relatively wide range, say 1.7 pounds per cubic foot to 8 or more pounds per cubic foot. By suitable selection of the polyester, the dry tensile strength may be varied from about 6 p.s.i. to 50 p.s.i. The wet tensile strength is generally about half the dry tensile strength. In cases where elongation is important, elongations of between 200% and 500% can be obtained by introducing cross-links into the polymer in known manner.

As pointed out above, the present products are characterized particularly by their hydrophilic properties. These properties may be measured in a rough empirical fashion by using the sponge to pick up moisture by a blotting action, or by wiping a known amount of water from a surface, or by determining the sinking time of a sponge placed on the surface of water. However, it has been found that the most significant and reliable test is one in which the sponge is put in a definite amount of water containing a dye so that it is colored, and the rise of the water in the sponge is measured with respect to time by visual observation. When the present products are tested in this manner, a capillary rise of 0.75" or more occurs within a period of a few seconds.

In general the foamed products made in accordance with the present invention are extremely light, soft, tough and elastic. They have good strength, are stable to heat, washable and dry cleanable. Their ability to withstand heat, for example 200°–300° F. permits these sponges to be sterilized. The products with discontinuous cells have good thermal, sound and electrical insulating properties which, coupled with their ability to adhere to a variety of metallic and non-metallic surfaces, make their use as insulating materials quite important. They may be made as desired with a fine textured, soft and velvety feel, or may be coarser with variable pore sizes more closely resembling cellulose or natural sponges.

In order to point out more fully the nature of the present invention the following specific examples are given of illustrative products made according to the invention and the procedures by which they can be made. In these examples the values of various properties of the described products are given. In most cases both dry and wet tensile strength is set forth and the related elongation values are given. That is to say, the elongation values given are percent elongation of the sample at the time of failure under the tensile test.

Capillary rise was measured in the manner generally described above. One end of the sponge was dipped in 0.5" of colored water and the capillary rise measured at the end of 40 seconds. The "swell" is the increase in volume of the sponge upon immersion in water. Three different water absorbency tests, designated (1), (2) and (3), were used in evaluating the products described in the specific examples. The values for "Absorbency (1)" were obtained by weighing the dry sponge, immersing it in water and squeezing 5-10 times allowing it to drain one minute, reweighing it and calculating the percent increase in weight of the sponge. "Absorbency (2)" was measured by placing the sponge on the surface of water without exerting downward pressure thereon for a period of three minutes, removing the sponge and allowing it to drain for one minute, and determining the percent increase in weight. "Absorbency (3)" was measured in the same manner as "Absorbency (2)" except that the sponge was held below the surface of the water without squeezing.

Other properties listed are given in conventional units.

Example 1

This example illustrates preparation of a foamed plastic having a relatively high dry tensile strength.

A polyester mixture having a molecular weight of about 2000–3000 was prepared comprising two parts by weight of a linear condensation product of triethylene glycol and adipic acid and one part by weight of a linear condensation product of ethylene glycol and adipic acid. A reaction vessel was charged with 40 grams of this polyester mixture and 40 grams of a solid polyglycol polymer having a molecular weight of about 1000 (Carbowax 1000). This mixture was heated to 35°–40° C. in order to melt and blend the polyglycol. Thereafter 32.3 grams of metatoluene diisocyanate was added and thoroughly mixed in. The diisocyanate was a mixture of the 2,4 and 2,6 isomers sold under the trade name Hylene TM.

The resulting mixture was heated to 100°–110° C. and held at that temperature for 60 minutes, then cooled to room temperature. The reaction product was analyzed for free isocyanate groups and a further quantity of isocyanate was added sufficient to increase the free NCO to 10.5% by weight.

To 112 grams of the prepolymer as thus prepared were added 1 gram of Witco 77–86 wetting agent (described above), 3 grams of a 50–50 mixture of Triton X–151 and Triton X–171 wetting agent, 4 grams of 2-pyrrolidone, 4 drops of 25% aqueous ammonium hydroxide and 2.4 grams of water. The added components were stirred vigorously for 5 to 10 seconds until the mixture was uniform and had a milky appearance. This mixture was then poured into a mold which had previously been treated with a release agent and allowed to rise and set for 30 minutes. After a 30-minute period the mold was put in an oven for 30 minutes at 70° C. during which time the foam became cured.

The cured foam thus obtained had the following properties:

| | |
|---|---|
| Dry tensile strength _____ p.s.i__ | 45–48 |
| Elongation _____ percent__ | 360 |
| Wet tensile strength _____ p.s.i__ | 22 |
| Elongation _____ percent__ | 237 |
| Sinking time _____ minutes__ | 3+ |
| Density _____ lbs./cu. ft__ | 5.34 |
| Absorbency (1) _____ percent__ | 867 |
| Swell _____ do____ | 49.4 |
| Capillary rise _____ inch__ | 11/16 |

Example 2

This example illustrates the preparation of a relatively hard foam.

A pre-polymer was prepared in the manner described in Example 1 except that 40 grams of a condensation product of diethylene glycol and adipic acid sold under the trade name Paraplex U–148 was substituted for the polyester of Example 1 and the quantity of diisocyanate used was such as to give a free NCO content of 15.4%. 56 grams of this pre-polymer was reacted with 0.5 gram of Witco 77–86 and 1.5 grams of a 50–50 mixture of Triton X–151 and X–171, together with 2 grams of 2-pyrrolidone and 2.7 cc. of water. The foam obtained from this reaction mixture after curing had the following properties:

| | |
|---|---|
| Dry tensile strength _____ p.s.i__ | 14 |
| Elongation _____ percent__ | 290 |
| Wet tensile strength _____ p.s.i__ | 11.9 |
| Elongation _____ percent__ | 340 |
| Pandux hardness _____ | 83 |
| RMA hardness _____ | 4 |
| RMA tactile test _____ | Firm |

Example 3

This example illustrates the preparation of a relatively soft foam.

A pre-polymer was prepared according to the procedure of Example 1 except that it was adjusted to a free isocyanate content of 12.4%. 56 grams of this pre-polymer was foamed with 0.5 gram of Witco 77–86, 1.5 grams of a 50–50 mixture of Triton X–151 and X–171, 2 grams of 2-pyrrolidone and 2.7 cc. of water. The cured foam obtained from this reaction mixture had the following properties:

| | |
|---|---|
| Dry tensile strength _____ p.s.i__ | 15.6 |
| Elongation _____ percent__ | 420 |
| Wet tensile strength _____ p.s.i__ | 12.7 |
| Elongation _____ percent__ | 505 |
| Pandux hardness _____ | 56 |
| Density _____ lbs./cu. ft__ | 3.04 |

Example 4

This example illustrates the preparation of a material for applications wherein a high wet tensile strength is desired.

A pre-polymer was prepared in accordance with the general procedure of Example 1 but using 3 parts by weight of the polyester to 1 part by weight of the polyglycol of molecular weight 1000. 1.61 parts by weight of metatoluene diisocyanate was used.

112 grams of this pre-polymer were foamed with 4 grams of Witco 77–86, 5 grams of 2-pyrrolidone containing 5 drops of ammonium hydroxide and 2.8 grams of water. The resulting foam after curing had the following properties:

| | |
|---|---|
| Dry tensile strength _____ p.s.i__ | 32.7 |
| Elongation _____ percent__ | 301 |
| Wet tensile strength _____ p.s.i__ | 25.3 |
| Elongation _____ percent__ | 495 |
| Dry sinking time _____ minutes__ | 2 |
| Wet sinking time _____ seconds__ | 45 |
| Density _____ lbs./cu. ft__ | 4.69 |
| Absorbency (1) _____ percent__ | 883 |
| Swell _____ do____ | 46 |
| Capillary rise _____ inch__ | 3/8 |

Example 5

This example shows the preparation of a relatively high density foam.

A pre-polymer was prepared according to the procedure of Example 1 except that the free NCO content was adjusted to 8.4%. 112 grams of this pre-polymer was foamed with 1 gram of Witco 77–86, 3 grams of a 50–50 mixture of Triton X–151 and X–171 together with 4 grams of 2-pyrrolidone and 2.2 grams of water. The cured foam obtained from this reaction mixture had the following properties:

Dry tensile strength_____p.s.i__ 16
    Elongation _____percent__ 340
Wet tensile strength_____p.s.i__ 12.7
    Elongation _____percent__ 260
Density _____lbs./cu. ft__ 7.50

Example 6

This example shows the preparation of a foam having a relatively low density.

A pre-polymer was prepared according to Example 1 except that the free NCO content was adjusted to 14.1%. 56 grams of this pre-polymer was treated with 0.5 gram of Witco 77–86 and 1.5 grams of a 50–50 mixture of Triton X–151 and X–171, together with 2 grams of 2-pyrrolidone and 2.7 grams of water. The cured foam made from this reaction mixture had the following properties:

Dry tensile strength_____p.s.i__ 25
    Elongation _____percent__ 210
Wet tensile strength_____p.s.i__ 12
    Elongation _____percent__ 250
Density _____lbs./cu. ft__ 1.77
Sinking time _____minutes__ 3+
Swell _____percent__ 18.2
Absorbency (2) _____do____ 67
Absorbency (3) _____do____ 101.5

Example 7

This example illustrates the preparation of a foam having a relatively high water absorbency.

112 grams of a pre-polymer prepared according to the procedure of Example 1 and mixed with an additional 11 grams of metatoluene diisocyanate was treated with 1 gram of Witco 77–86, 4 grams of a 50–50 mixture of Triton X–151 and X–171, 8 cc. of 2-pyrrolidone and 9.8 cc. of water. The cured foam obtained from this reaction mixture had the following properties:

Dry tensile strength_____p.s.i__ 6
Wet tensile strength_____p.s.i__ 8
Density _____lbs./cu. ft__ 1.89
Sinking time _____minutes__ 3+
Absorbency (2) _____percent__ 1409
Absorbency (3) _____do____ 2470
Swell _____do____ 18.4
Capillary rise _____inch__ 15/16

Example 8

This example illustrates the preparation of a foam having a water absorbency comparable to that of the foam of Example 7 but a somewhat greater density.

A pre-polymer was prepared according to the procedure of Example 1 but using 25 grams of metatoluene diisocyanate instead of the 32.3 grams used in Example 1. 105 grams of this pre-polymer was treated with 1 gram of Witco 77–86, 3 grams of the 50–50 mixture of Triton X–151 and X–171, 5 cc. of 2-pyrrolidone containing 5 drops of ammonia and 3.5 cc. of water. The cured foam had the following properties:

Dry tensile strength_____p.s.i__ 10
    Elongation _____percent__ 200
Wet tensile strength_____p.s.i__ 5.3
    Elongation _____percent__ 65
Sinking time _____minutes__ 3+
Density _____lbs./cu. ft__ 4.51
Absorbency (2) _____percent__ 1677
Swell _____do____ 82.4
Capillary rise _____inch__ 11/16

Example 9

This example illustrates preparation of a foam having a high percentage swell.

The procedure of Example 8 was repeated except that the quantity of water was reduced from 3.5 cc. to 2.4 cc. The properties of the cured foam were as follows:

Dry tensile strength_____p.s.i__ 11
    Elongation _____percent__ 200
Wet tensile strength_____p.s.i__ 5
    Elongation _____percent__ 60
Sinking time _____minutes__ 3+
Density _____lbs./cu. ft__ 4.2
Absorbency (1) _____percent__ 1671
Swell _____do____ 87.3
Capillary rise _____inch__ 9/16

Example 10

This example illustrates preparation of a foam having a low percent swell.

112 grams of a pre-polymer prepared from 20 grams of polyglycol M.W. 1000, 60 grams of the polyester of Example 1 and 32.3 grams of metatoluene diisocyanate was foamed with 1 gram of Witco 77–86, 3 grams of a 50–50 mixture of Triton X–151 and X–171, 5 cc. of 2-pyrrolidone containing 5 drops of ammonia and 2.8 cc. of water. The cured foam had the following properties:

Dry tensile strength _____p.s.i__ 38
    Elongation _____percent__ 325
Wet tensile strength _____p.s.i__ 21
    Elongation _____percent__ 290
Sinking time _____minutes__ 3+
Density _____lbs./cu. ft__ 5.58
Absorbency (1) _____percent__ 697
Swell _____do____ 12
Capillary rise _____inch__ 5/16

Example 11

This example illustrates preparation of a foam similar to that of Example 9.

112 grams of a pre-polymer prepared from 60 grams of polyglycol M.W. 1000, 20 grams of the polyester of Example 1 and 32.3 grams of metatoluene diisocyanate was foamed with, 1 gram of Witco 77–86, 3 grams of a 50–50 mixture of Triton X–151 and X–171, 5 cc. of pyrrolidone containing 5 drops of ammonia and 2.8 cc. of water. The cured foam had the following properties:

Dry tensile strength _____p.s.i__ 28
    Elongation _____percent__ 250
Dry Sinking time _____minutes__ 3+
Wet sinking time _____do____ 1
Density _____lbs./cu. ft__ 6.5
Absorbency (1) _____percent__ 1137
Swell _____do____ 82
Capillary rise _____inch__ 8/16

Example 12

This example illustrates preparation of a foam having a relatively high capillary rise.

A pre-polymer prepared according to Example 1 but having an NCO content of 8.75% was used. 112 grams of this pre-polymer was treated with 2 grams of coarse calcium carbonate filler (Lesamite) and foamed with 1 gram of Witco 77–86, 3 grams of a 50–50 mixture of Triton X–151 and X–171, 4 cc. of 2-pyrrolidone and 2.4 cc. water. The cured foam had the following properties:

Dry sinking time _____minute__ 1
Wet sinking time _____seconds__ 9
Absorbency (2) _____percent__ 618
Absorbency (3) _____do____ 619
Swell _____do____ 64
Capillary rise _____inch__ 15/16

Example 13

This example illustrates the preparation of a foam having a very short wet sinking time.

112 grams of the pre-polymer of Example 12 having an NCO content of 9.92% was foamed with 1 gram of Witco 77–86, 3 grams of a 50–50 mixture of Triton X–151 and X–171, 5 cc. of 2-pyrrolidone and 2.8 cc. of water. The cured foam obtained from this reaction mixture had the following properties:

| | | |
|---|---|---|
| Dry tensile strength | p.s.i. | 12.5 |
| Elongation | percent | 400 |
| Wet tensile strength | p.s.i. | 6 |
| Dry sinking time | minutes | 2 |
| Wet sinking time | seconds | 4 |
| Density | lbs./cu. ft. | 4.35 |
| Absorbency (2) | percent | 6.9 |
| Absorbency (3) | do | 716 |
| Swell | do | 32 |
| Capillary rise | inch | 11/16 |

Example 14

A pre-polymer was prepared from 40 grams of polyglycol M.W. 1000, 40 grams of a polyester prepared from diethylene glycol and adipic acid and having a 5% crosslink (M.W. 2000-3000) and a sufficient amount of metatoluene diisocyanate to give 8.2% NCO. 112 grams of this pre-polymer was foamed with 1 gram of Witco 77–86, 3 grams of a 50-50 mixture of Triton X–151 and X–171, 4 cc. of 2-pyrrolidone, and 2.4 cc. of water. The cured foam had the following properties:

| | | |
|---|---|---|
| Dry tensile strength | p.s.i. | 22 |
| Elongation | percent | 420 |
| Wet tensile strength | p.s.i. | 14.5 |
| Elongation | percent | 300 |
| Density | lbs./cu. ft. | 5.71 |
| Capillary rise | inch | 9/16 |

Example 15

112 grams of a pre-polymer similar to that of Example 14 but having an NCO content of 14% was treated with 1 gram of Witco 77–86, 3 grams of a 50-50 mixture of Triton X–151 and X–171, 4 cc. of 2-pyrrolidone and 2.4 cc. of water. The cured foam had the following properties:

| | | |
|---|---|---|
| Dry tensile strength | p.s.i. | 25 |
| Elongation | percent | 230 |
| Wet tensile sterngth | p.s.i. | 11 |
| Elongation | percent | 250 |
| Density | lbs./cu. ft. | 1.77 |
| Swell | percent | 18 |
| Absorbency (2) | do | 67 |

Example 16

The polyester used in this example was prepared by condensation of 1.0 mols of dimer acid with 1.2 mols of diethylene glycol and 0.1 mol of trimethylol propane. It had a molecular weight of about 2000 to 3000, an acid number of 2.4 and an hydroxyl number of 65.

A pre-polymer was prepared by reacting equal parts by weight of this polyester and polyethylene glycol M.W. 1000 with a sufficient quantity of metatoluene diisocyanate to give an NCO value of 6.6%. This pre-polymer was foamed in accordance with the procedure of Example 1 and gave a foam having hydrophilic properties.

Example 17

A pre-polymer was prepared from equal parts by weight of polyethylene glycol M.W. 1000 and a copolymer of 12 mols triethylene glycol, 6 mols ethylene glycol, 16 mols diglycolic acid, 0.24 mol trimethylol propane and a sufficient quantity of metatoluene diisocyanate to provide 5.15% NCO (M.W. about 1200). 109 grams of this pre-polymer was treated with 1 gram of Witco 77–86, 4 grams of 2-pyrrolidone and 2.4 cc. of water. The resulting cured foam had the following properties:

| | | |
|---|---|---|
| Dry tensile strength | p.s.i. | 7.4 |
| Elongation | percent | 300 |
| Wet tensile strength | p.s.i. | 5.2 |
| Elongation | percent | 120 |
| Density | lbs./cu. ft. | 7.32 |
| Capillary rise | inch | 11/16 |

The foregoing examples are intended to illustrate the way in which the properties of the present foamed plastics can be varied. It is of course to be understood that these examples are illustrative only and that numerous changes can be made in the proportions, conditions and ingredients set forth therein without departing from the spirit of the invention as defined in the appended claims.

I claim:

1. In a method for the manufacture of polyurethane foamed plastics by reaction of organic diisocyanates with blends of polyalkylene glycols having molecular weights of 600 to 6,000 and linear polyesters which are essentially condensation products of polyhydric alcohols and polycarboxylic acids in the presence of water, a wetting agent and a catalyst and curing of the foamed plastic, the weight ratio of said polyglycol to said polyester being between about 0.6:1 and 1.5:1, the improvement which comprises using as said catalyst from 1% to 10% by weight of the reaction mixture of a pyrrolidone selected from the group consisting of 2-pyrrolidone, N-methylpyrrolidone and vinylpyrrolidone to provide a foam having improved hydrophilic properties.

2. A method according to claim 1 and wherein said catalyst is 2-pyrrolidone.

3. A method according to claim 1 and wherein said catalyst is N-methylpyrrolidone.

4. A method according to claim 1 and wherein said catalyst is vinylpyrrolidone.

5. In a method for the manufacture of polyurethane foamed plastics of the type wherein a prepolymer that has been formed by reaction of an excess of an organic diisocyanate with a blend of polyalkylene glycols having molecular weights of 600 to 6,000 and polyesters which are essentially condensation products polyhydric alcohols and polycarboxylic acids, the weight ratio of said polyglycols to said polyesters being between about 0.6:1 to 1.5:1, to provide a prepolymer having free isocyanate groups, is reacted with a mixture of water, a wetting agent and a catalyst to form said foamed plastic and cure it, the improvement which comprises using as said catalyst from 1% to 10% by weight of the reaction mixture of a pyrrolidone selected from the group consisting of 2-pyrrolidone, N-methylpyrrolidone and vinylpyrrolidone to provide a foam having improved hydrophilic properties.

References Cited in the file of this patent

UNITED STATES PATENTS

| 2,729,618 | Muller et al. | Jan. 3, 1956 |
| 2,779,689 | Reis | Jan. 29, 1957 |
| 2,780,350 | Simon et al. | Feb. 5, 1957 |

OTHER REFERENCES

Abernathy: "Rubber World," March 1955, volume 131, No. 6, pages 765 and 766.